S. BERGE.
CLEANING DEVICE FOR HAND RAKES.
APPLICATION FILED JULY 22, 1914.
1,138,530.
Patented May 4, 1915.
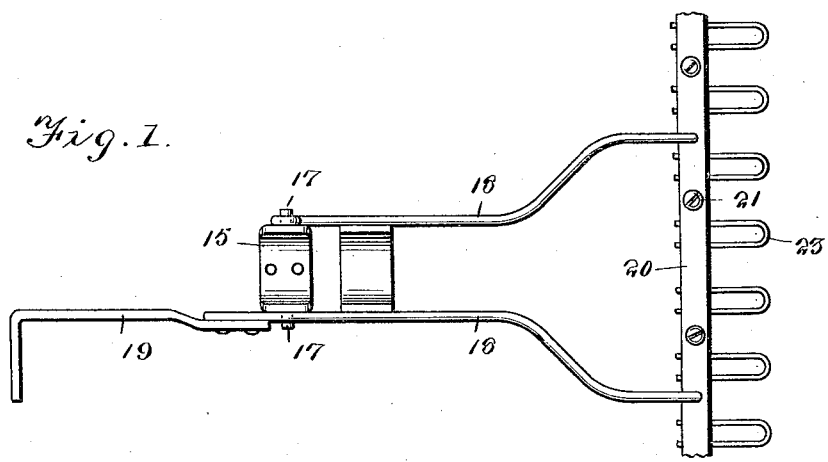
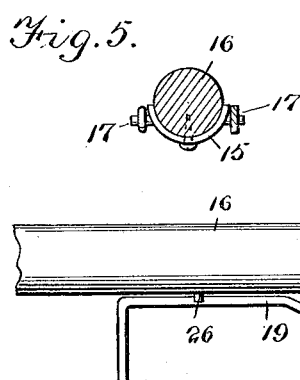
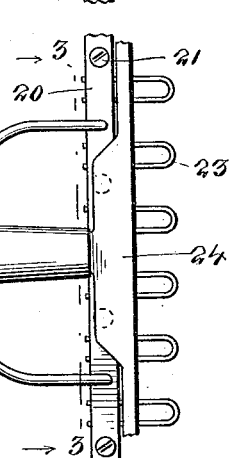
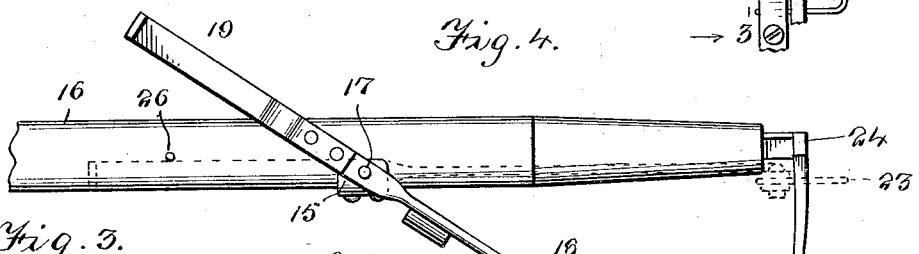
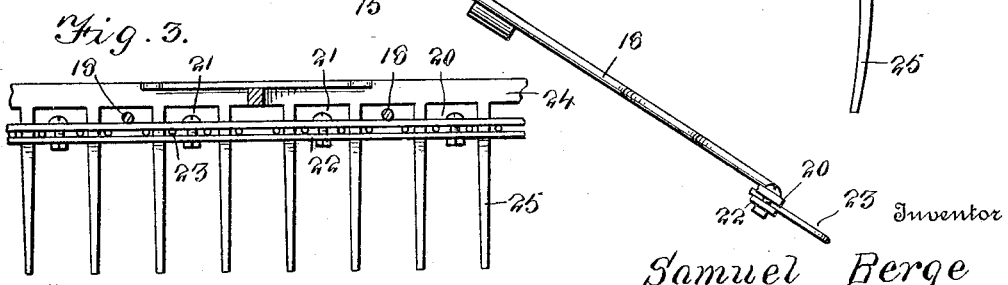
Inventor
Samuel Berge
By Victor J. Evans
Attorney
Witnesses
E. P. Rulphut
Wm. Dagger

UNITED STATES PATENT OFFICE.

SAMUEL BERGE, OF LETHBRIDGE, ALBERTA, CANADA.

CLEANING DEVICE FOR HAND-RAKES.

1,138,530. Specification of Letters Patent. Patented May 4, 1915.

Application filed July 22, 1914. Serial No. 852,529.

*To all whom it may concern:*

Be it known that I, SAMUEL BERGE, a citizen of the United States of America, residing at Lethbridge, in the Province of Alberta and Dominion of Canada, have invented new and useful Improvements in Cleaning Devices for Hand-Rakes, of which the following is a specification.

This invention relates to cleaning devices for hand rakes, and it has for its object to produce a simple and efficient device of this character which may be readily applied to a lawn rake of ordinary construction.

A further object of the invention is to produce a device of the character described which in addition to serving as a cleaning device may be used for picking up material that has been gathered by the rake and for carrying the same without necessity for touching it with the hands.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—Figure 1 is a plan view showing the improved appliance detached. Fig. 2 is a plan view showing a portion of a rake with which the appliance has been assembled. Fig. 3 is a sectional view taken on the line 3—3 in Fig. 2. Fig. 4 is a side view showing the device in position for picking up material to be carried by means of the device. Fig. 5 is a sectional detail view taken on the line 5—5 in Fig. 2.

Corresponding parts in the several figures are denoted by like characters of reference.

The improved appliance comprises a clip 15 of approximately semi-circular shape so that it may be readily fitted on the handle 16 of an ordinary lawn rake, said clip being provided with diametrically opposite pintles 17 on which are pivoted the side members 18 of the improved appliance. One of said side members has a rearwardly extending handle 19 whereby the appliance may be manipulated. The side members 18 diverge forwardly and are connected together by a bar 20 which is firmly secured to said side members. Detachably connected with the bar 20 by means of bolts 21 is a clamp bar 22, and between the bars 20 and 22 there is mounted a plurality of approximately U-shaped loops 23 formed of wire. 24 designates the rake head which is assembled with the handle 16 in the customary manner, said head having the downwardly extending teeth 25. The rake teeth 25 and the U-shaped loops 23 are so arranged that the rake teeth may extend through the portions of the loops that extend forwardly of the bars 20, 22, and the device may be so manipulated by swinging the appliance about the pivots 17 that the loop carrying bars may thus lie closely adjacent to the rake head or may be moved to a spaced position with respect to the rake head and the teeth thereof, as seen in Fig. 4 of the drawings. The handle 19 of the appliance is preferably slightly resilient so that it may engage a stop member 26 connected with the rake handle, thus retaining the loop carrying bars in position closely adjacent to the rake head, but enabling said handle 19 to be readily disengaged from the stop member when it is desired to tilt the appliance.

When the loop carrying bars are positioned closely adjacent to the rake head, the rake may be utilized in the customary manner for the purpose of gathering cut grass, leaves or rubbish of any kind. Any material that adheres to the rake teeth may be easily and quickly disengaged therefrom by simply releasing the handle 19 from the stop member 26 and then tilting the appliance, when the loops 23 will clear the rake teeth of any adhering rubbish. When a pile has been formed the appliance may be tilted to the position shown in Fig. 4, and the loops, the loop carrying bars and the forward portions of the side members may now be utilized to pick up the pile of material which, by moving the same in the direction of the rake teeth, will be held by the latter while being carried to a dumping place.

Having thus described the invention, what is claimed as new, is:—

1. A rake appliance comprising a clip having laterally extending pintles, side members pivoted on the pintles, one of said side members being provided with a rearwardly extending handle and both of said side members diverging forwardly, a bar secured to the divergent forward ends of the side members, a clamp bar connected therewith, and U-shaped loops interposed between said bars.

2. The combination with a rake including a handle and a rake head having teeth, of a clip secured on the rake handle and having laterally extending pintles, side members pivoted on the pintles, one of said side members being provided with a rearwardly extending handle, and both of said side members diverging forwardly, a bar secured to the forward ends of the side members, a clamp bar, bolts connecting the latter with the first mentioned bar, and U-shaped loops interposed between the bars, extending forwardly therefrom and engaging the rake teeth.

3. The combination with a rake including a handle and a rake head having teeth, of a clip secured on the rake handle and having laterally extending pintles, side members pivoted on the pintles, one of said side members being provided with a rearwardly extending handle, and both of said side members diverging forwardly, a bar secured to the forward ends of the side members, a clamp bar, bolts connecting the latter with the first mentioned bar, and U-shaped loops interposed between the bars, extending forwardly therefrom and engaging the rake teeth; and a stop member secured to the rake handle and lying in the path of the rearwardly extending handle of one of the side members.

In testimony whereof I affix my signature in presence of two witnesses.

SAMUEL BERGE.

Witnesses:
FRANCIS GERALD HOLYOKE,
GEO. W. GREEN.

Copies of this patent may be obtained for five cents each, by addressing the "Commissioner of Patents, Washington, D. C."